(12) United States Patent
LaGuardia et al.

(10) Patent No.: US 8,118,189 B2
(45) Date of Patent: Feb. 21, 2012

(54) TEMPERATURE-INDICATING SLEEVE AND RELATED CONTAINER

(75) Inventors: Wendy LaGuardia, Randolph, NJ (US); Donald LaGuardia, Jr., Wayne, NJ (US)

(73) Assignee: Cups Unlimited, LLC, Randolph, NJ (US)

( * ) Notice: Subject to any disclaimer, the term of this patent is extended or adjusted under 35 U.S.C. 154(b) by 305 days.

(21) Appl. No.: 11/956,558

(22) Filed: Dec. 14, 2007

(65) Prior Publication Data

US 2008/0142529 A1 Jun. 19, 2008

Related U.S. Application Data

(60) Provisional application No. 60/870,288, filed on Dec. 15, 2006.

(51) Int. Cl.
*A47J 39/00* (2006.01)

(52) U.S. Cl. .............. 220/592.24; 220/739; 374/150

(58) Field of Classification Search .......... 220/739, 220/737, 592.2, 592.24, 592.26, 592.01, 220/738; 206/459.1, 534, 45.59; 374/159, 374/161, 162, 150, 157
See application file for complete search history.

(56) References Cited

U.S. PATENT DOCUMENTS

| | | | | | |
|---|---|---|---|---|---|
| 3,684,123 | A | * | 8/1972 | Bridges | 220/592.17 |
| 3,782,195 | A | * | 1/1974 | Meek et al. | 374/161 |
| 4,829,539 | A | * | 5/1989 | Angus et al. | 374/159 |
| 5,052,369 | A | * | 10/1991 | Johnson | 126/400 |
| 5,222,656 | A | * | 6/1993 | Carlson | 229/403 |
| 5,282,683 | A | * | 2/1994 | Brett | 374/150 |
| 5,588,747 | A | * | 12/1996 | Blevins | 374/157 |
| 5,645,196 | A | * | 7/1997 | Hancuff | 222/183 |
| 5,738,442 | A | * | 4/1998 | Paron et al. | 374/162 |
| 5,746,372 | A | * | 5/1998 | Spence | 229/403 |
| 5,927,085 | A | * | 7/1999 | Waldman | 62/129 |
| 6,041,952 | A | * | 3/2000 | Martin | 215/12.1 |
| 6,315,192 | B1 | * | 11/2001 | Marlow | 229/401 |
| 6,324,963 | B1 | * | 12/2001 | Cirasole | 99/285 |
| 6,386,756 | B1 | * | 5/2002 | Rice | 374/157 |
| 6,619,479 | B2 | * | 9/2003 | Jones et al. | 206/554 |
| 6,802,938 | B2 | * | 10/2004 | Mohan et al. | 162/135 |
| 6,974,051 | B1 | * | 12/2005 | Lin | 222/25 |
| 7,225,937 | B2 | * | 6/2007 | Schroeder | 215/10 |
| 7,243,795 | B2 | * | 7/2007 | Gold et al. | 206/459.5 |
| 7,581,643 | B2 | * | 9/2009 | Wilskey et al. | 206/736 |
| 7,614,498 | B2 | * | 11/2009 | O'Keefe | 206/459.5 |
| 2002/0167989 | A1 | * | 11/2002 | Russo | 374/141 |

* cited by examiner

*Primary Examiner* — Jacob K Ackun
*Assistant Examiner* — Kareen Rush
(74) *Attorney, Agent, or Firm* — Leydig, Voit & Mayer, Ltd.

(57) ABSTRACT

A sleeve with a temperature indicator in or on the side wall thereof, which is visible from outside the sleeve, to convey the temperature of the contents in the container with which it is used. A method for making such a sleeve is also provided.

18 Claims, 7 Drawing Sheets

TEMPERATURE-INDICATING SLEEVE AND RELATED CONTAINER

This application claims benefit of Provisional Application No. 60/870,288, filed Dec. 15, 2006, which is incorporated herein by reference in its entirety.

BACKGROUND OF THE INVENTION

Field of the Invention

When hot beverages are purchased for immediate consumption, they are most often sold in a disposable, insulated cup. Because the cup is at least partially insulated, it is very difficult for the consumer to know if the beverage is too hot for consumption, unless they feel the contents. Hot beverages, such as coffee or tea, can be served at such a high temperature that they have the potential to scald or burn the mouth, lips or other parts of the body if spilled. A similar situation exists when other liquids or solids are sold or prepared at home in a disposable, insulated cup, such as hot soup or hot chili. The consumer does not know if the contents are too hot to be consumed.

Also, a similar situation exists when the contents of a cup or container are heated in a microwave. The consumer does not know if the contents were heated to an unacceptable level for consumption.

As beverage and food consumption purchased and consumed "on the go" via fast food restaurants and coffee houses continues to rise, the need to inform consumers of the temperature of their beverage or food prior to consumption becomes more important toward eliminating this type of injury, and as a consequence of such, lawsuits and liability issues.

Likewise, as food and beverages are often re-heated in microwaves, the need to identify the temperature of the contents of a cup or container prior to consumption is critical toward eliminating these same injuries, especially as more small children use the microwave.

U.S. Design Pat. No. 343,129 to Farley discloses an ornamental design for a temperature measuring cup that has a thermometer on its outer surface. This design, however, is not adequate for handling hot foods mentioned above, because a consumer can be burned on contact with the cup.

U.S. Pat. No. 4,919,983 to Fremin discloses a container for feeding infants, which has a body formed by blow molding from a thermoplastic, light-permeable material. The container is shaped like a baby bottle or cup and contains, in formulation, along with the thermoplastic material, a thermochromic composition consisting of from 5 to 10 percent by weight. This combination permits the container to undergo a distinct change in color when the temperature of the contents within it exceeds a given threshold providing a conspicuous indication of the liquid contents if above the human zone of comfort. Another embodiment incorporates the thermochromic composition in the middle composite of a multi-layered polyethylene bag for use with baby feeding container having a rigid outer enclosure and a polyethylene liner bag. Like the cup in U.S. Design Pat. No. 343,129, this container is not suitable for handling hot foods for substantially the same reasons.

U.S. Pat. No. 5,282,683 discloses a plastic cup for measuring the temperature of urine using a thermometer insert mounted to an elongated backing member. The elongated backing member is resilient and "springs" back to its normally flat condition if bent. The thermometer is inserted into the container that has an opening such that the thermal scale member is capable of being observed through the container wall. This design, however, is not suitable for handling hot liquids.

U.S. Pat. No. 5,588,747 to Blevins discloses a measuring cup with a thermometer mounted on an exterior surface thereof for measuring the temperature of a liquid prior to placing it in the cup. The cup can be used in many operations involving a liquid that have a critical temperature requirement. One such operations is bread making in which water, once it has been warmed to a desired temperature, is added to yeast or, alternately, to a flour mixture containing yeast. To use the cup in bread making, the cup is placed under a stream of warm water and, when the thermometer indicates the water has reached the desired temperature, the water in a measured amount is added to the cup. This cup is not designed to measure the temperature of its contents, making it unsuitable for many different applications related to consumption of hot beverages, as discussed above.

U.S. Pat. No. 5,720,555 to Elele discloses a temperature indicating container apparatus that includes an inner container portion made from substantially heat insulating material. A thermochromic-substance-containing portion is juxtaposed against an outside surface of the inner container portion, such that color changes of the thermochromic-substance-containing portion can be seen from outside the inner container portion. The thermochromic-substance-containing portion may be in a form of a jacket around the outside surface of the inner container portion. The jacket may include a plurality of windows. An outermost container portion may be located outside both the thermochromic-substance-containing jacket and the inner container portion. The outermost container portion is light transmissive, such that color changes of the thermochromic-substance-containing jacket can be seen from outside the outermost container portion. A bridge element bridges top portions of the inner container portion and the outermost container portion. This design is ineffective for indicating accurate temperature of a liquid inside the container.

U.S. Pat. No. 6,264,049 to Shteynberg discloses a nursing bottle for handling liquid foods and for feeding infants having a main side wall formed as a hollow shell with an attached elongated hollow appendix compartment propagated into the inner chamber of the bottle. The hollow appendix compartment contains a device for temperature sensing, which allows to determine the temperature of liquid foods inside the bottle. This design, however, is inadequate for handling hot liquids due to the lack of thermal insulation. Furthermore, formation of a hollow appendix compartment for holding the thermometer involves an expensive and complicated process, making the container impractical, particularly if is to be disposable.

U.S. Pat. No. 6,386,756 to Rice discloses a cup for indicating the temperature of the contents thereof and a method of making the same. The cup includes a body that is cup-shaped and a temperature sensitive strip that is disposed on the body and indicates the temperature of the contents thereof. The body, however, includes two cups, an inner cup that is disposed in, and is in intimate contact with, an outer cup. The use of two cups for the body makes this product expensive to produce, both in terms of materials utilized and the formation process. Furthermore, there is a possibility that these cups can separate, which may result in various injuries, for example, scolding, if a hot liquid is in the cup.

It is apparent that various temperature measuring containers, the representative examples of which are discussed above, have been disclosed. However, these containers are either not suitable for the purposes of the present invention or are too expensive and/or complicated to produce. Thus, there is a need for a temperature-indicating container or a sleeve that is safe for handling hot liquids, inexpensive and easy to produce and accurate in measuring the temperature of the liquid inside the cup.

SUMMARY OF THE INVENTION

A temperature-indicating sleeve capable of being placed on or around and in contact with an outer surface of a container. The sleeve and/or the container have a known thermally insulating property. The sleeve comprises a top opening, a bottom opening, at least one sleeve wall having an outer surface; and a visually observable temperature indicator on or in the sleeve wall. The temperature indicator is calibrated according to the known insulating property of the container and/or the sleeve and is capable of determining a temperature of contents of the container to an accuracy of within about 4 F.

A container in combination with the above-noted sleeve is also provided. The temperature indicator indicates the temperature, temperature range, or degree of hotness or coldness (these terms are used interchangeably and synonymously herein, so that, for example, indicia "Hot" may also be referred to as an indication of temperature) of the contents therein is provided.

In another embodiment, the container has a temperature sensitive indicator that indicates the temperature, temperature range, or degree of hotness or coldness of the contents therein, and can be observed by the consumer by looking at the outside of the container. The temperature indicator is calibrated to the known insulating properties of the container and is capable of indicating the temperature within about 4 F. Therefore the temperature indicator is made to correspond to a container of pre-determined insulating properties.

When the consumer views the temperature, temperature range, or degree of hotness or coldness on the outside of the container or sleeve, the consumer can then decide if the contents of the container are at an acceptable temperature level for consumption. If the contents are too hot or too cold to consume, the consumer can wait until the temperature falls to an acceptable level. The temperature indicator preferably adjusts to the changing temperature to reflect the new temperature, temperature range or degree of hotness or coldness. In this way, the consumer can wait until their optimal, preferred temperature is reached and displayed on the temperature indicator. Since consumers have different heat preferences and tolerance levels, each consumer can make an individual decision as to what temperature, temperature range or degree of hotness or coldness is best for them to consume the contents of the cup or container.

Also, a sleeve for a container that insulates a hot or cold container from a person's hand and a method for making it are provided. The sleeve contains a temperature sensitive indicator that indicates the temperature, temperature range, or degree of hotness or coldness of the contents in the container therein. The temperature sensitive indicator, which is preferably calibrated to account for at least some thermal insulation provided by the container and/or the sleeve, can be observed by the consumer by looking at the outside of the sleeve.

When the consumer views the temperature, temperature range, or degree of hotness or coldness on the outside of the sleeve, the consumer can then decide if the contents of the container to which the sleeve is used is at an acceptable temperature level for consumption. If the contents are too hot or too cold to consume, the consumer can wait until the temperature falls to an acceptable level. The temperature indicator preferably adjusts to the changing temperature to reflect the new temperature, temperature range or degree of hotness or coldness. In this way, the consumer can wait until their optimal, preferred temperature is reached and displayed on the temperature indicator. Since consumers have different heat preferences and tolerance levels, each consumer can make an individual decision as to what temperature, temperature range or degree of hotness or coldness is best for them to consume the contents of the cup or container.

BRIEF DESCRIPTION OF THE DRAWINGS

The features and advantages of this invention will be apparent from the description of drawings and the detailed description immediately following.

DETAILED DESCRIPTION OF THE INVENTION

Figure 1:
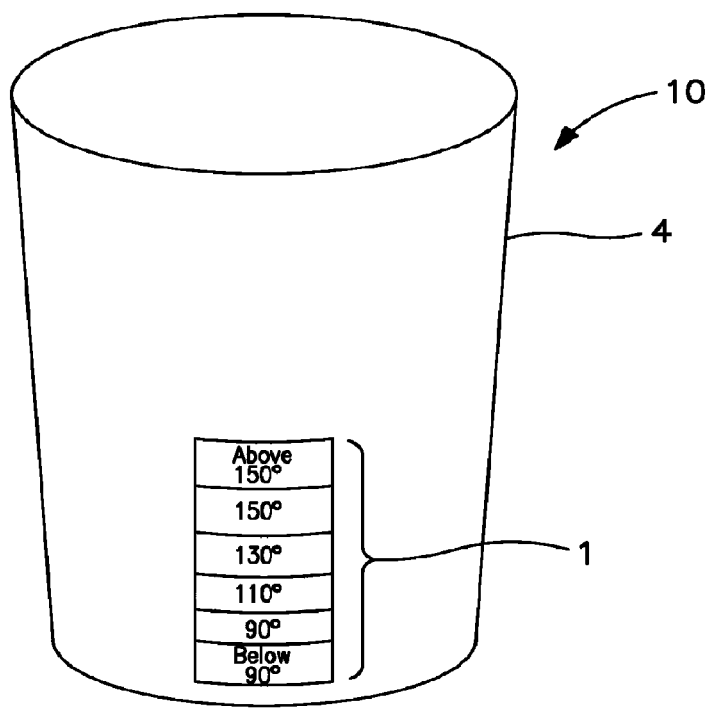
FIG. 1 is a front view of a container in accordance with an embodiment of the present invention from a consumer's perspective.

The present invention provides a temperature-indicating sleeve to be used with a container to sufficiently indicate the temperature of the liquid and/or other contents inside the container and is easy and inexpensive to produce, making it possible for this container and sleeve to be disposable. This is achieved by placing a thermal indicator in or on the side wall of the sleeve such that it is visible from outside the sleeve and container. The temperature indicator to be used on the sleeve is calibrated to account for at least some thermal insulation provided by the container and/or sleeve.

Alternatively, or in addition, the present invention provides a temperature-indicating sleeve in which the temperature indicator is calibrated to the known insulating properties of a specific container and/or sleeve. In this embodiment, the temperature indicating sleeve is matched or paired with a container of same insulating properties for which the temperature indicating sleeve is made. In this embodiment, the temperature indicating sleeve is in combination with a container of known insulating properties.

Alternatively, or in addition, the present invention provides a temperature-indicating container in which the temperature indicator is calibrated to the known insulating properties of a specific container. In this embodiment, the temperature indicator is matched or paired with a container of same insulating properties for which the temperature indicator is made. In this embodiment, the temperature indicator is in combination with a container of known insulating properties.

The temperature indicating container provides a container that is safe to use with hot and/or cold liquids, sufficiently accurate in measuring the temperature of the liquid and/or other contents inside the container and is easy and inexpensive to produce, making it possible for this container to be disposable. This is achieved by placing a thermal indicator in or on the side wall or bottom of the container, either in thermal contact with a liquid or in thermal contact with a thermally conducting part of the side wall or bottom. The thermal indicator, such as a thermometer, may be placed in the opening of the thermally insulated part of the side wall, so that it is visible from outside the container.

As used in the context of the present invention, a "container" has a side wall and a bottom member that define a space capable of holding a liquid. The container is preferably cup-shaped and is capable of holding liquids and/or iced beverages at various temperatures, ranging from the freezing point to the boiling point. For example, based on the materials selected, the container can preferably hold liquid in a temperature range of about 0° C. to about 100° C. Preferably, in such a case, the container is a cup made of paper stock with at least one layer of Styrofoam® adhered, laminated and/or foamed on its outer surface for thermal isolation.

As used herein, a "side wall" is a wall of the container, which has one or more layers made from the same or different materials. If more than one layer is present, these layers are laminated, adhered or otherwise attached to each other, making this side wall and the container have a "single container" structure, which is different from the "double cup" structure in the above-mentioned U.S. Pat. No. 6,386,756. The double cup structure in accordance with this patent is made by inserting one cup into another cup, such that the inner cup is in intimate contact with the outer cup. An example of a container with a side wall in accordance with the present invention is, for example, a Dixie® Perfectouch™ cup available from the Georgia Pacific Dixie Company or a three-layered insulated cup available from Insulair, Inc. and described in U.S. Pat. No. 6,422,456. Also, the temperature strip disclosed in U.S. Pat. No. 6,386,756 is not calibrated to account for thermal insulation of any component of the "double cup".

As used herein, a "thermally insulated" container can preferably be held or touched by human skin without creating a burning sensation when filled with a liquid at a temperature of at least about 70° C., preferably at least about 80° C., more preferably at least about 90° C. The temperature of the thermally insulated container at the point of contact with the skin is preferably at least 5° C., more preferably at least 10° C., yet more preferably at least 20° C. lower than the temperature of the contents in the container when these contents have been in the container for about 30 to 60 seconds, provided that the temperature of the contents in the container is at least 20° C. higher than the ambient temperature.

The thermal insulation can be achieved by selecting materials for and/or controlling the thickness of the side wall. Thermal insulating properties of the container make it unnecessary to provide the container with a handle or any other device in order to avoid being burned. However, such a handle or device may be used, for example, for easier handling, especially for larger-sized containers.

As used herein, a "thermally insulating" material is, for example, a material having a thermal conductivity, at 298K, of less than about 0.1 W/m·K, preferably less than about 0.06 W/m·K, more preferably less than about 0.04 W/m·K. Styrofoam® is an example of such a material. Conversely, a "thermally conductive material" has a thermal conductivity greater than that of a thermally insulating material.

As used herein, a "thermally conducting part" easily transmits heat and allows for a reasonably accurate determination of the temperature of the contents of the container when the temperature indicator is in contact therewith. Preferably, the thermally conducting part is such that the temperatures on both surfaces thereof differ by less than about 5° C., more preferably less than about 3° C. when the container is filled with a liquid having a temperature of at least 70° C. and is left standing for at least 30 seconds at room temperature. The thermally conducting part is preferably cellulose-based (at least 50% by weight cellulose). Preferably, the thermally conducting part is substantially not absorptive. For example, in case of paper stock, a thin layer of polymeric film may be applied to the surface that may come into contact with the liquid to reduce or prevent absorption.

As used herein, a "thermally insulating part" is such that it, either by itself or together with the thermally conducting part, provides the container with the above-discussed thermally insulating properties. While it is preferable to form the thermally insulating part from a thermally insulating material, such a material is not necessarily used. The thickness or porosity, for example, of other types of materials may be varied to achieve desired results.

The thermally insulating part is preferably made from a non-cellulosic material. Such a material contains less than 50% weight cellulose, preferably less than 20% by weight, more preferably less than 1% by weight or no cellulose. Examples of preferable non-cellulosic materials include foamed synthetic polymeric films, such as foamed polystyrene.

Since the thermal insulation and transmission can be controlled by changing the thickness of a material, both the thermally insulating part and the thermally conducting part in accordance with the present invention can be made from the same material. For example, a partial "cut out" from the side wall may make a portion of this side wall sufficiently thin to function as a thermally conducting part in accordance with the present invention. Therefore, the side wall may comprise only a single layer, albeit having a varying thickness.

Several preferred embodiments of the present invention are described below with reference to the drawings.

Figure 2:
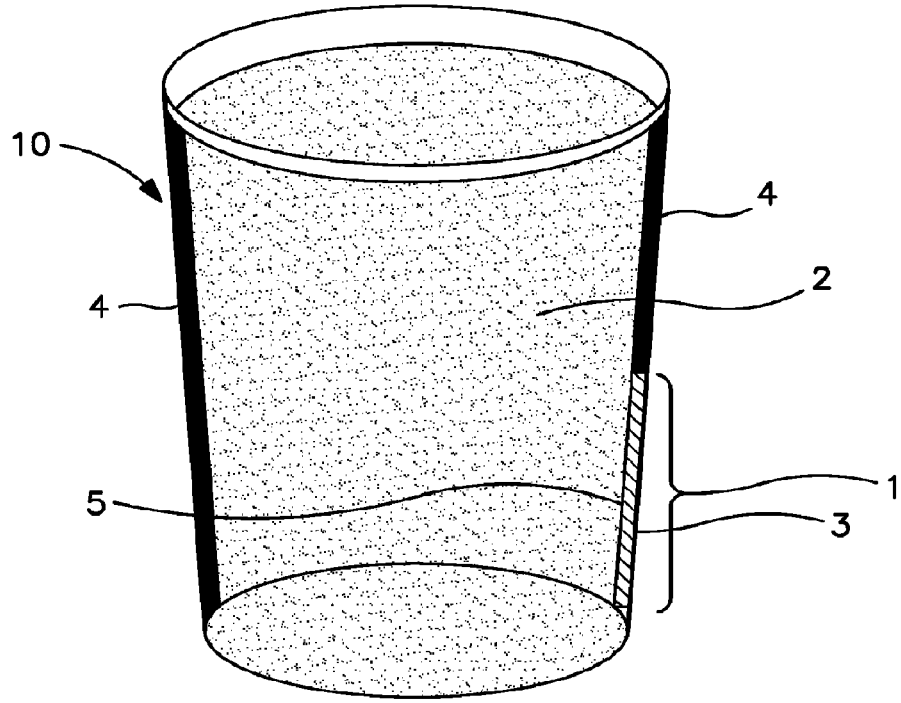
FIG. 2 is a cutaway side view of the container shown in FIG. 1.

FIGS. 1 and 2 show a disposable container that is mostly insulated for the purpose of holding hot beverages or food. While this container is shown in the form of a cup, various other shapes are within the scope of the present invention. Also, the dimensions (e.g., height, length, thickness, etc.) of different components (e.g., the temperature indicator, layers, etc.) in FIGS. 1 and 2, as well as in the other figures, are depicted for demonstrative purposes only, and their actual dimensions and dimensional relationships are not necessarily as shown in the figures.

Referring to FIG. 2, the cup or container has an insulation layer 4. This insulation layer has an opening in which temperature indicator 1 is located. The inner part 5 of the temperature indicator 1, which is used to detect the temperature, is capable of being in direct contact with the contents 2 placed in the cup 10. Preferably, this inner part 5 is not in contact with the insulating part of the container. However, for example, four edges of the temperature indicator may be in contact with the insulation layer of the cup solely for the purpose of sealing the temperature indicator to the cup. The outer part 3 of the temperature indicator 1, which contains a temperature scale or the like, is visible to the consumer from outside the container and can be directly touched by the consumer. If desired, the container may be formed so that insulation or another material or layer is placed over the outer part 3, for example, in order to prevent accidental burns. However, such insulation, material or layer should not prevent the reading of the temperature indicator.

In this embodiment, heat is conducted by the contents of the container directly to the temperature indicator, and not through any part of the cup or container, in order to more accurately measure the temperature or temperature range. The opening for the temperature indicator can be anywhere on the cup or container, as long as the inner part of the temperature indicator is capable of being in contact with the contents of the cup or container when filled. Preferably, this opening is located where the contents of the cup or container are likely to be in contact with the indicator with minimal filling. The outer part of the temperature indicator is preferably visible to the consumer for the purposes of displaying the temperature.

The cup as shown in FIGS. 1 and 2 can be manufactured in such as way as to create the entire insulating cup or container and cut out a small area from the cup or container. The small "cut out" area or opening should preferably substantially match the size of the temperature indicator. The temperature strip can then be applied and sealed to the container in the area of the "cut out." The inner part of the temperature indicator should be in contact with the contents of the container, when filled, and the outer part of the temperature indicator should be visible to the consumer for the purposes of displaying the temperature or the like. While FIG. 1 depicts the cup or container with a temperature indicator in a form of a strip that has temperature numbers, various types of temperature indicators, such as those that convey temperature range, degree of hotness indicia, and the like, may be used.

The cup or container and temperature indicator are manufactured to form a single unit. The temperature indicator in this embodiment is preferably applied during the manufacturing process and not by the consumer.

Furthermore, in this embodiment, the temperature indicator is not intended to be removed from the cup or container. The temperature indicator may be placed in any position on the cup or container (e.g. vertically, horizontally, diagonally).

In this embodiment, the temperature indicator is preferably affixed to the container using an adhesive, which is food-safe. A listing of appropriate food-safe compounds may be found in Title 21, Chapter I, Section 175.105, of the Code of Federal Regulations. Preferably, the adhesive employed in accordance with the present invention is of the type typically used to seal disposable cups intended for hot liquids. Such an adhesive is food-safe and can be exposed to a high temperature environment when a hot liquid is placed into the cup. Furthermore, it is already available to cup manufacturers, resulting in lower production costs. Other examples of suitable adhesives include polysiloxane-based Silirub® adhesives available from Soudal NV, Turnhout, Belgium, and EP48 epoxy, available from Masterbound, Inc., Hackensack, N.J.

Figure 3:
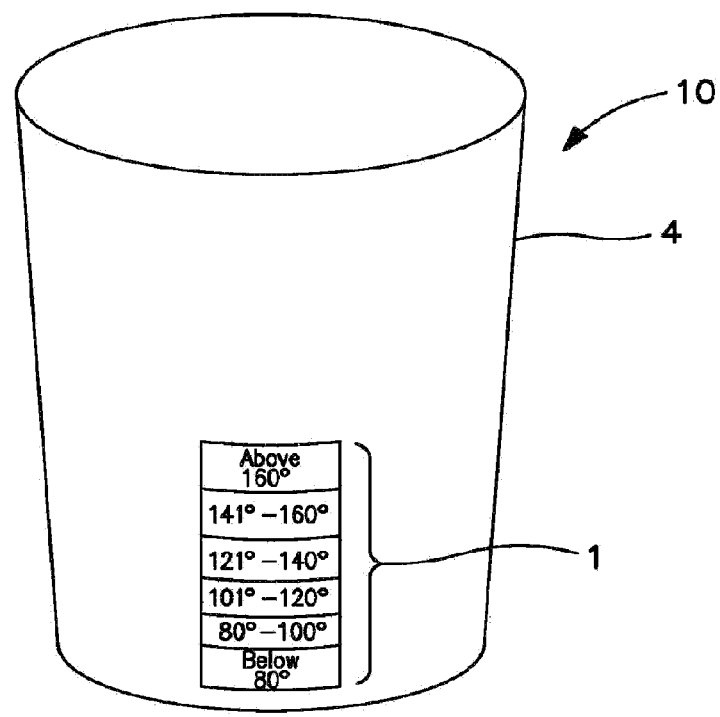
FIG. 3 is a front view of a container in accordance with another embodiment of the present invention from a consumer's perspective.
Figure 4:
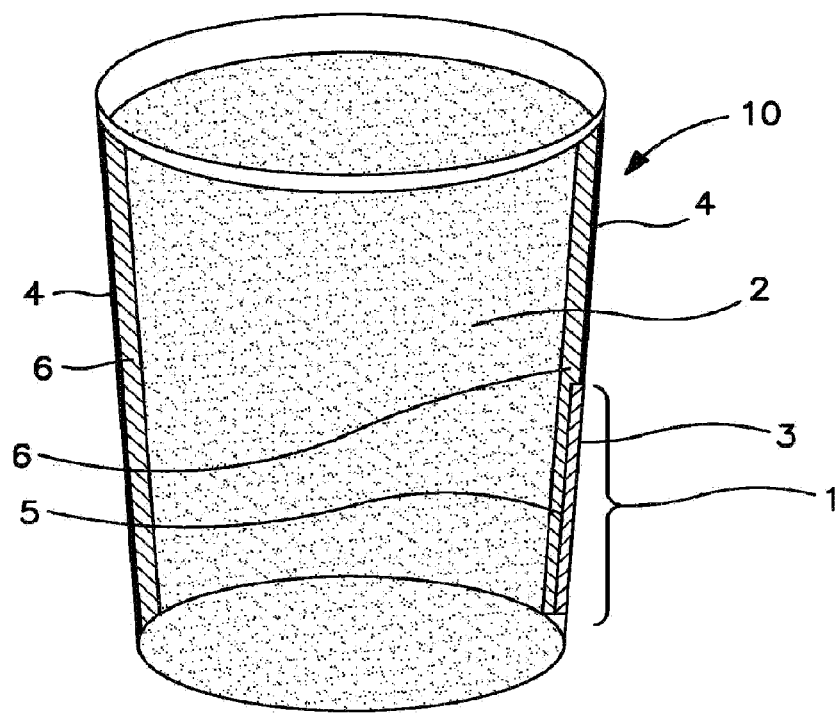
FIG. 4 is a cutaway side view of the container shown in FIG. 3.
Figure 5:
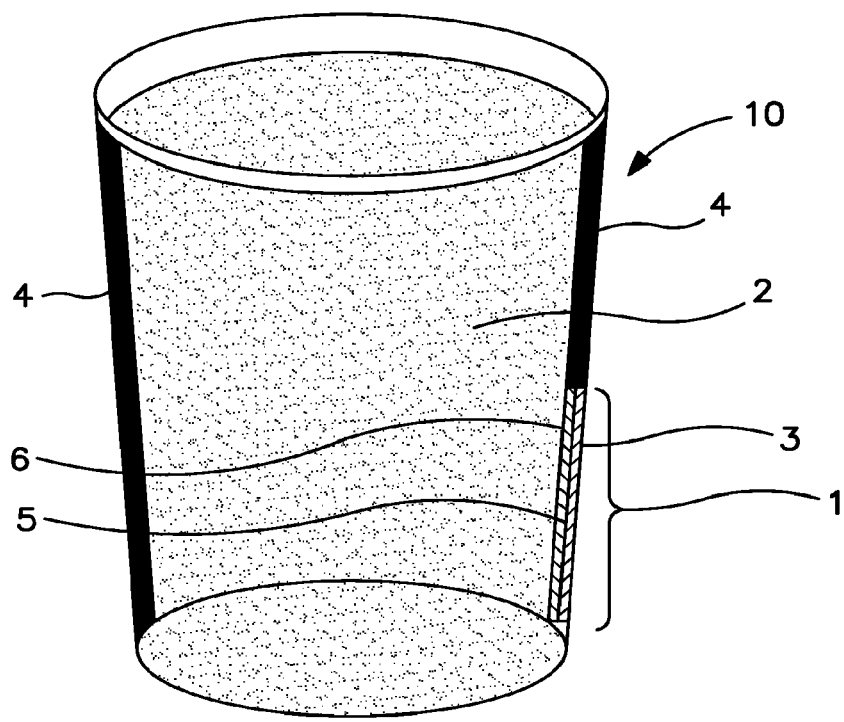
FIG. 5 is a cutaway side view of another embodiment of the container shown in FIG. 3.

Another embodiment of a container in accordance with the present invention is shown in FIGS. 3-5. In this embodiment, a container in the form of a cup has a thermally insulating part 4 and a thermally conducting part 6. Preferably, the container is mostly insulated for the purpose of holding hot beverages or food. The temperature indicator 1 is in thermal contact with a thermally conducting part 6. In particular, the inner part 5 of the temperature indicator 1 is in contact with a thermally conducting part 6. The outer part of the temperature indicator can be touched directly by the consumer. Heat is conducted through the thermally conducting part of the container to the temperature indicator in order to measure the temperature, temperature range or degree of hotness of the contents of the container.

The thermally conducting part can be located anywhere on the container as long as the thermally conducting part is capable of being in contact with the contents of the container when filled, and the temperature indicator is in thermal contact with the thermally conducting part of the container. The thermally conducting part of the container is preferably located where it is likely to be in contact with the contents of the container with even minimal filling.

This structure in accordance with the present invention can be manufactured in such a way as to create the entire insulating cup or container and "cut out" a small area from the cup or container. A thermally conductive material would be placed over the "cut out" and then the temperature strip would be applied to the thermally conducting part or the thermally conducting part can be applied first to the temperature indicator and then together, the thermally conducting part and the temperature indicator can be applied and sealed to the "cut out" area of the cup or container. The small "cut out" area should preferably substantially match the size of the temperature indicator. The thermally conducting part of the container should be in contact with the contents and the inner part of the temperature indicator, and the outer part of the temperature strip should be visible from outside the container.

In another embodiment, the entire, or substantially the entire, inner surface of the container may be a part of a thermally conducting part. A thermally insulating part may be adhered to, laminated on or attached to the thermally conducting part. This structure, however, as discussed above, differs from a double-cup construction disclosed in U.S. Pat. No. 6,386,756, which has various disadvantages. In particular, the use of two cups in this patent increases the thickness of the container, as well as the cost and complexity of its production. Furthermore, the inner and outer cup may separate and lead to injuries, particularly if the contents of the cup are hot.

The present invention, as discussed above, utilizes a single container construction, making the modification of existing products and manufacturing methods simpler and less expensive than generally would be needed to implement a double-cup construction. For example, such a container may be structured similarly to a thermoplastic resin foam covered paper cup disclosed in U.S. Pat. No. 4,435,344, which is incorporated herein by reference, modified to include a temperature indicator. This cup is formed by placing a thermoplastic resin film on a paper container and heating the container to foam the film, creating a thermally isolating layer. In order to form a container in accordance with the present invention, a temperature indicator may be incorporated into the cup during the manufacturing process.

For example, a temperature indicator may be adhered on one surface of a paper sheet having, for example, a basis weight of 240 $g/m^2$ and a moisture content of 7%. A low density polyethylene may be extrusion-coated in a thickness, for example, of about 20 microns on the same surface. The sheet can then be shaped into a container form using a conventional cup-making machine, with the coated surface being the outer surface.

The total thickness of the paper sheet with the polyethylene film may be, for example 0.34 mm. This paper container may then be heated in an electric oven at a temperature of about 135° C. for about 2 minutes to foam the polyethylene, forming a foamed thermally-insulating layer on the outer surface. Since the temperature reading on the temperature indicator should be visible from outside the cup, the indicator may be masked during the application of the polyethylene film. Alternatively, a part of the paper sheet may be masked and the temperature indicator may be attached to the paper before or after the foaming. The latter process is preferred if the temperature indicator is not reversible, or if it may be damaged during the coating and/or foaming process. However, if the temperate indicator can tolerate the film-forming and foaming processes, the film may be used to hold the temperature indicator in place in lieu of an adhesive and the like. This arrangement can provide a more accurate temperature reading. It will be understood that various modifications of this process are possible in order to obtain the desired structure.

For example, a container having its outer surface laminated or coated with a thermoplastic film may be prepared by blanketing a side wall member from a sheet made from, for example, paper, one surface of which is coated or laminated with a thermoplastic synthetic resin film or an aluminum foil. A bottom panel member is blanked out from this sheet or another sheet having no film or foil. These sheets are fabricated into a container by using a conventional cup-forming machine so that the coated surface faces outward.

The thermoplastic synthetic resin layer of the so-manufactured container is then heated to foam it and form a heat-insulating layer on the outer surface of the container. The temperature indicator may be applied to the sheet before the resin and/or may be masked as discussed above.

Alternatively, a container is fabricated from a body member and bottom panel member blanked out from a sheet (e.g., a paper sheet) having no thermoplastic synthetic resin film or other layer. The outer surface of the container is coated with a prepolymer of thermoplastic synthetic resin by spraying it and then the prepolymer is cured by applying ultra-violet rays to form a film in situ. The film on the wall surface of the so-formed container can then be heated to foam it and form a heat-insulating layer. Again, the temperature indicator may be applied to the sheet before prepolymer and/or may be masked as discussed above.

Alternatively, a heat-insulating paper container of this invention may be prepared as follows. A body blank is cut out from a sheet (e.g., a paper sheet) one surface of which is coated or laminated with a thermoplastic synthetic resin film and then heated to foam the thermoplastic synthetic resin film to thereby form a thermal insulating layer. Alternatively, this sheet is heated to foam the thermoplastic synthetic resin film, and a body blank having a foamed heat-insulating layer is cut out from the heated sheet. A bottom blank is cut out from a sheet (e.g., a paper sheet) at least one surface of which is coated or laminated with a thermoplastic synthetic resin film or an aluminum foil, or one surface of which is coated or laminated with a thermoplastic synthetic resin film and the other surface of which is coated or laminated with the same or different thermoplastic synthetic resin film or an aluminum foil, or which is neither coated nor laminated with such materials. Then, this blank is optionally heated, if the sheet has the thermoplastic synthetic resin film, or alternatively, a sheet (e.g., a paper sheet) one surface of which is coated or laminated with a thermoplastic synthetic resin film and the other surface of which is coated or laminated with the same or different thermoplastic synthetic resin film or an aluminum foil is optionally heated to foam the thermoplastic synthetic resin film to thereby form a thermal insulating layer. A bottom blank having a foamed thermal insulating layer is cut out from the heated sheet. The body blank having a thermal insulating layer on the outer surface and the bottom blank having or not having a thermal insulating layer are then fabricated into a thermal insulating paper container with a conventional cup-making machine. Again, the temperature indicator may be applied as discussed above, with or without masking.

In all of the above-discussed methods, a portion of the surface of the side wall that will face the space for holding the contents of the container may be masked and the same or different thermal insulation may be applied to the rest of this surface. The masked portion, preferably, substantially matches the size of the portion of the surface with which the temperature indicator is in thermal contact, in order to more accurately detect the temperature of the container contents.

Thermoplastic synthetic resin films, which may be used in accordance with the present invention, include polyethylene, polypropylene, polyvinyl chloride, polystyrene, polyester, nylon and the like. Polystyrene is preferred. The term "polyethylene" includes low, medium and high density polyethylenes.

In another embodiment, a sleeve into which a container can be placed is provided. This sleeve includes a temperature indicator, which can come into thermal contact with the container and can indicate the temperature, range of temperatures and/or degree of hotness or coldness of the contents placed in the container. The dimensions (e.g., height, length, thickness) of the sleeve and the insulating properties and the design of the sleeve can vary. The temperature indicator may be placed directly on the outer surface of the sleeve wall or in the sleeve wall so that it is visible to the consumer for the purposes of displaying the temperature, degree of hotness, coldness or the like. The temperature indicator can be applied to the sleeve during the manufacturing or distribution process or the temperature indicator can be applied to the container by the consumer.

In another embodiment, the sleeve includes a temperature indicator, which can come into thermal contact with the container and can indicate the temperature, range of temperatures and/or degree of hotness or coldness of the contents placed in the container. The temperature indicator is attached at least partially within an opening in the sleeve wall or is externally attached on the sleeve wall.

In this embodiment, the temperature indicator is calibrated based on a known amount of insulation or known insulating properties of the container and/or the sleeve. The temperature-indicating sleeve is made to match the thermal insulating properties of the container and/or sleeve to which it is calibrated. The temperature-indicating sleeve and the container form a matching pair based on the thermal insulating properties of the container and sleeve. The temperature-indicating sleeve, when used with non-matching thermally insulating containers may not indicate the correct temperature of the contents in the container if the thermally insulating properties of the container or sleeve shield more or less heat than the container to which the temperature-indicating sleeve was tested.

Various types of temperature indicators, such as temperature strips, may be used in the context of the present invention. Preferably, the temperature indicator is sufficiently thin so that it can be incorporated into the wall of the container or the sleeve without creating a protrusion. More preferably, the temperature indicator (with or without any external layer thereon) is flush with the outer surface. Also, preferably, the temperature indicator is reversible and the temperature readout adjusts as the temperature of the contents of the container changes. However, non-reversible indicators may also be used.

In the embodiment where the temperature indicator may come into direct contact with the contents of the container, this indicator preferably is food safe. The inner part 5 of the temperature indicator in accordance with the present invention may comprise at least one layer of a material, which preferably does not substantially affect the accuracy of the temperature reading (e.g., by less than about 5° C.). Preferably, the material used is food safe, particularly in view of a possibility of being in contact with hot, acidic liquids. Examples of such materials include paper that is generally used in making disposable paper cups and thin polymeric films.

Figure 6:
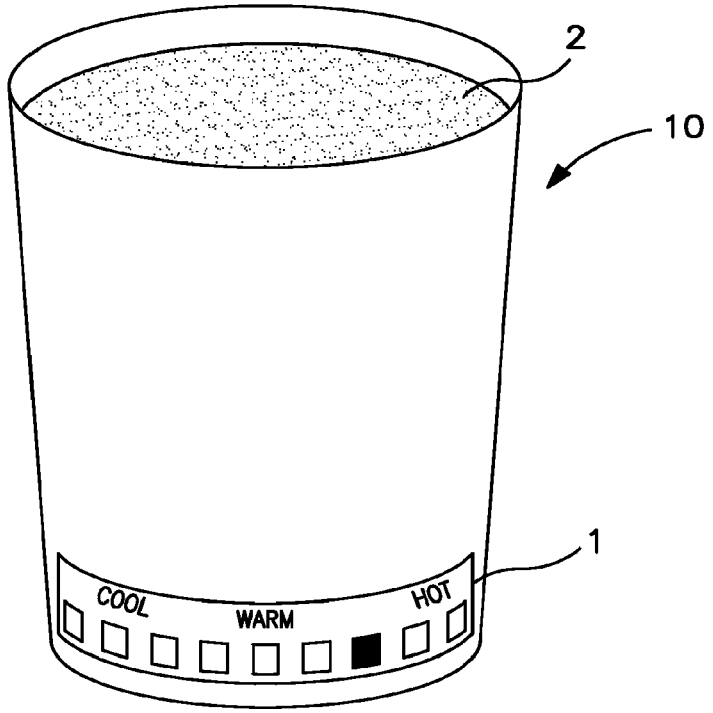
FIG. 6 is a front view of a container in accordance with yet another embodiment of the present invention from a consumer's perspective.
Figure 7:
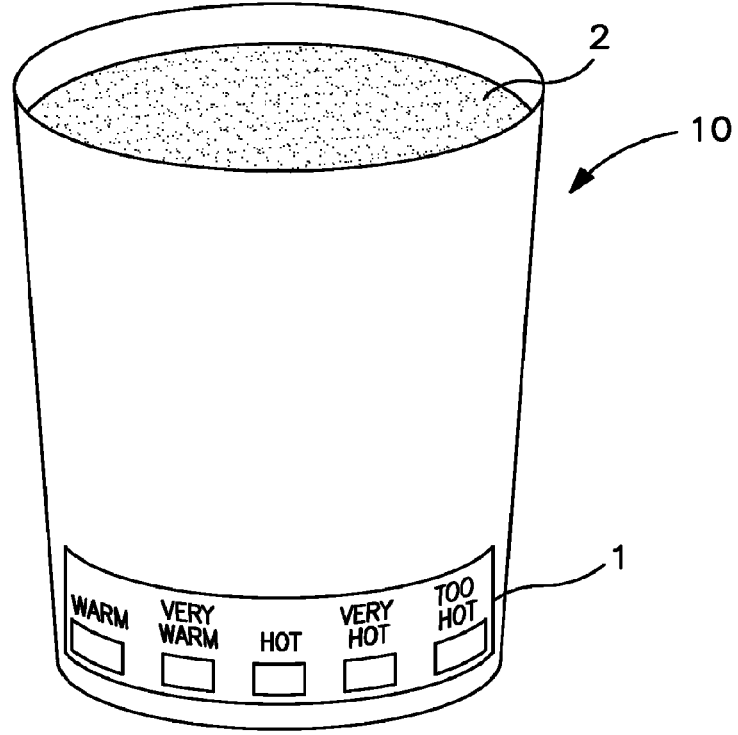
FIG. 7 is a front view of a container in accordance with yet another embodiment of the present invention from a consumer's perspective.

While FIGS. 1-5 depict a cup-shaped container with a temperature indicator that is in the form of a vertical temperature strip that has temperature ranges, other variations of temperature strips, such as those that convey temperature numbers or have degree of hotness indicia (e.g., color or labels, such as cool, warm, hot, etc.) as shown in FIGS. 6 and 7 and the like may be used. For example, the degree of hotness indicia may be "too hot" (e.g., above about 72° C.), "very hot" (e.g., from above about 65° C. to about 72° C.), "hot" (e.g., from about 58° C. to about 65° C.), "very warm" (e.g., from about 52° C. to about 58° C.) and "warm" (e.g., from about 43° C. to about 52° C.). It should be understood that the temperatures associated with specific indicia are not absolute and may be changed as needed depending on the use of the container and/or the intended user, as some people are more sensitive to heat or cold temperatures than are others. Also, in all embodiments of the present invention, the temperature indicator may include a temperature scale. For example, the scale can be divided into increments of not more than 20 F.

The temperature indicator in all embodiments may monitor the temperature using one or more heat-sensitive indicators, such as a liquid crystal-type thermometer. Any one of the embodiments can also indicate multiple temperatures or temperature ranges, such as the current temperature, the temperature or temperature range immediately above the current temperature, and the temperature or temperature range immediately below the current temperature, if desired. The specific design and artistry in which the temperature numbers, temperature ranges or degree of hotness are displayed to the consumer can vary based on preferences utilizing different colors, styles, and the like. Some temperature indicators for use in the present invention can be purchased from Technical Industrial Products, Cherry Hill, N.J.

The temperature indicator can be placed in any position on the cup or container or sleeve (i.e., vertically, horizontally, diagonally). Preferably, the temperature indicator is located not higher than the midpoint, more preferably not higher than one third of, the side wall of the container (whether on the container itself or on the sleeve), so that the temperature information can be obtained with minimal filling. Also, the temperature indicator may be formed into the bottom of the container in the same way as discussed above with respect to the side wall.

The container and temperature indicator can be manufactured so that the temperature indicator is applied by the consumer. This is most suitable in the embodiment where the temperature indicator is in thermal contact with the thermally conducting part of the container. Such a container may be manufactured as discussed above, with a portion of the thermally conducting part exposed. The temperature indicator may, for example, have an adhesive layer on its rear surface or the conducting part may have an adhesive thereon, allowing the indicator to be attached. The adhesive used for this type of application may be, for example, a contact or a pressure sensitive adhesive. Useful pressure sensitive adhesives include various silicone pressure adhesives available from Dow Corning, such as Dow Corning® 280A, Dow Corning® 282, and the like. If the adhesive is to come in contact with or be on a thermally conductive part, this adhesive is preferably heat resistant to at least a temperature of the expected contents of the container.

Even though the temperature indicator may be placed on a thermally conducting part of the container, the thermally conducting part will likely absorb at least some heat, which can make the temperature or degree of hotness reading somewhat imprecise. Therefore, the temperature indicator in accordance with the present invention can be calibrated to account for the thermal insulation provided by the part of the container and/or sleeve with which it is in thermal contact so that the temperature or degree of hotness of the contents in the container can be more accurately conveyed. Therefore, the container in accordance with the present invention can have any desirable amount of insulation and the temperature indicator can be calibrated to account for at least a part of this insulation.

Specifically, the calibration of the temperature indicator can take into account the specific insulating properties, compounds, thickness, etc., of the container and/or sleeve. The amount of heat that a particular container absorbs can be calculated based on these characteristics, and the temperature or degree of hotness indicia on the temperature indicator can be offset or adjusted accordingly. The resulting calibrated indicator can be tested prior to use to confirm the accuracy of the calibration. Further adjustments to the scale can then be made, if needed.

The accuracy of the calibration is such that it preferably accounts for at least 50% of the heat absorbed by the part of the container with which the temperature indicator is in thermal contact, more preferably at least 75%, even more preferably at least 90%. Alternatively, or in addition, the calibration is such that the displayed temperature or degree of hotness is preferably within about 8° C., more preferably within about 5° C., even more preferably within about 3° C. of the actual temperature of the contents inside the container. In yet another preferable embodiment, the degree of accuracy is within about 4 F.

Figure 8:
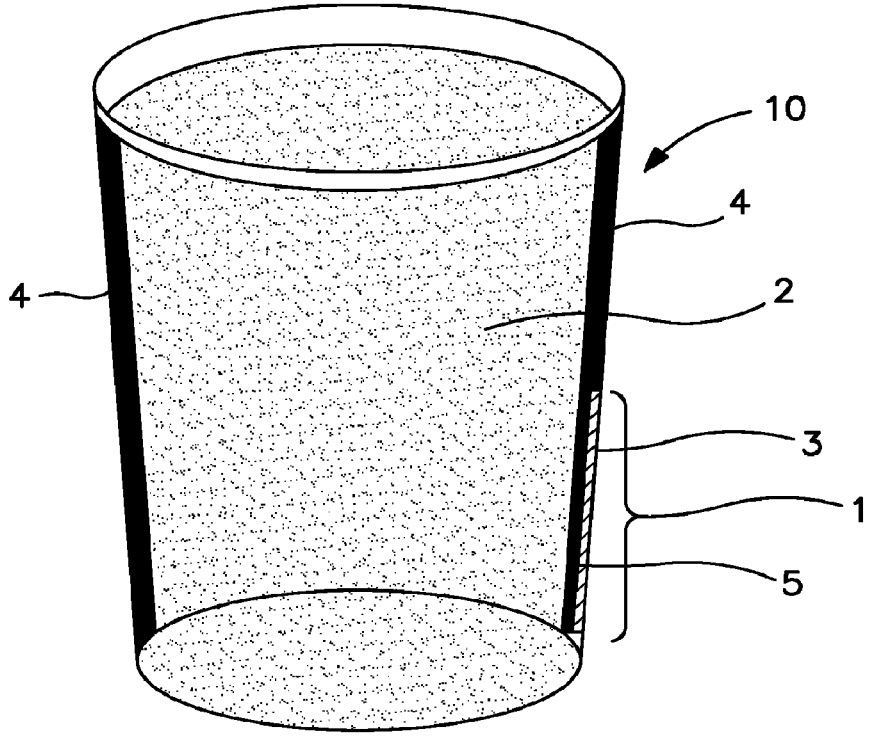
FIG. 8 is a cutaway side view of the container shown in FIG. 7.

The calibration of the temperature indicator can allow it to be used even on the thermally insulating part of the sleeve or the container or if the entire container, or substantially the entire container, is thermally insulated or semi-insulated, so long as at least some heat is conducted by the container. An example of such a container as yet another embodiment of the present invention is shown in FIGS. 7 and 8. The dimensions (e.g., height, length, thickness) of the container and the insulating properties of the container can vary. The temperature indicator may be placed directly on the outer surface of the side wall or the bottom wall of the container so that it is visible to the consumer for the purposes of displaying the temperature, degree of hotness or the like. Alternatively, in this embodiment, the temperature indicator can be applied to the container during the manufacturing or distribution process or the temperature indicator can be applied to the container by the consumer.

It should be understood that when the temperature indicator is calibrated, in accordance with the present invention the container can be thermally insulated to any desirable degree, so long as a sufficient amount of heat is transmitted to be detected. The container may, in part or as a whole, have a small amount of insulation, which can be provided, for example, by a thin layer of paper or the like, or have a larger amount of insulation, which can be provided, for example, by Styrofoam® or the like.

The temperature indicator in accordance with all embodiments of the present invention may measure the temperature or degree of hotness using one or more of the many different heat-sensing compounds and chemicals and is not limited to the widely used heat sensitive material today, such as liquid crystals. In this embodiment, it may be necessary to vary the thickness of the insulating wall on a portion of the container and/or sleeve, preferably reducing it, to increase the heat transfer in order to more accurately or easily measure and convert the temperature or degree of hotness to match or reflect the temperature or degree of hotness of the contents inside the container.

As in all embodiments of the present invention, the temperature indicator can be placed anywhere on the container and/or sleeve, and the temperature indicator is preferably visible to the consumer for the purposes of displaying the temperature or degree of hotness or coldness. Preferably, the temperature indicator is sufficiently thin so that it does not protrude from the container and/or sleeve. However, in some embodiments, at least a minor protrusion may be observed.

Specifically, the calibration of the temperature indicator can take into account the specific insulating properties, compounds, thickness, etc., of the sleeve and/or container. The amount of heat that a particular sleeve and/or container absorbs can be calculated based on these characteristics, and the temperature or degree of hotness or coldness indicia on the temperature indicator can be offset or adjusted accordingly. The resulting calibrated indicator can be tested prior to use to confirm the accuracy of the calibration. Further adjustments to the scale can then be made, if needed.

The accuracy of the calibration is such that it preferably accounts for at least 50% of the heat absorbed by the part of the sleeve or container with which the temperature indicator is in thermal contact, more preferably at least 75%, even more preferably at least 90%. Alternatively, or in addition, the calibration is such that the displayed temperature or degree of hotness or coldness is preferably within about 8° C., more preferably within about 5° C., even more preferably within about 3° C. of the actual temperature of the contents inside the container.

Figure 9:
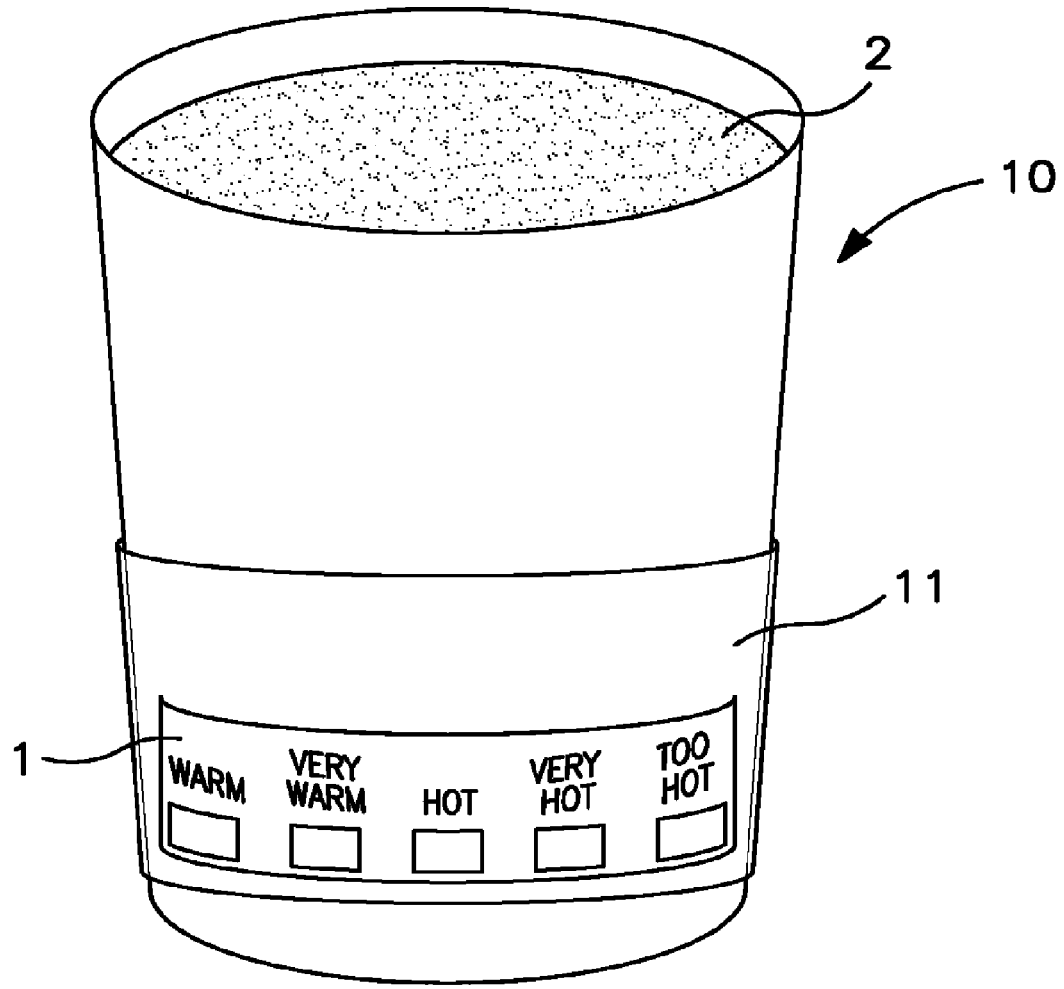
FIG. 9 is a front view of a sleeve in accordance with another embodiment of the present invention that is placed around a container.

An example of a sleeve in accordance with this embodiment is shown in FIG. 9. The dimensions (e.g., height, length, thickness) of the sleeve 11 and the insulating properties of the sleeve can vary. The temperature indicator 1 may be placed directly on the outer surface of the sleeve wall or in the sleeve wall so that it is visible to the consumer for the purposes of displaying the temperature, degree of hotness or the like. The temperature indicator can be applied to the sleeve during the manufacturing or distribution process or the temperature indicator can be applied to the container by the consumer.

It should be understood that when the temperature indicator is calibrated, in accordance with the present invention the sleeve and/or container can be thermally insulated to any desirable degree, so long as a sufficient amount of heat is transmitted to be detected. The container and/or the sleeve may, in part or as a whole, have a small amount of insulation, which can be provided, for example, by a thin layer of paper or the like, or have a larger amount of insulation, which can be provided, for example, by Styrofoam® or the like.

The temperature indicator in accordance with all embodiments of the present invention may measure the temperature or degree of hotness using one or more of the many different heat-sensing compounds and chemicals and is not limited to the widely used heat sensitive material today, such as liquid crystals. The temperature indicator can include thermotropic liquid crystals. Alternatively, or in addition, the temperature indicator can utilize a single color changing mixture against a background, where a contrast of the mixture against the background indicates the temperature of the contents of the container. For example, the mixture can be white and the background black. The temperature indicator is preferably capable of determining the temperature in a range from about 95 F to about 180 F. Preferably, the temperature indicator is attached to the sleeve with a heat-resistant and moisture-resistant adhesive.

In this embodiment, it may be necessary to vary the thickness of the insulating wall on a portion of the sleeve, preferably reducing it, to increase the heat transfer in order to more accurately or easily measure and convert the temperature or degree of hotness to match or reflect the temperature or degree of hotness of the contents inside the container to which it is used.

Figure 10:
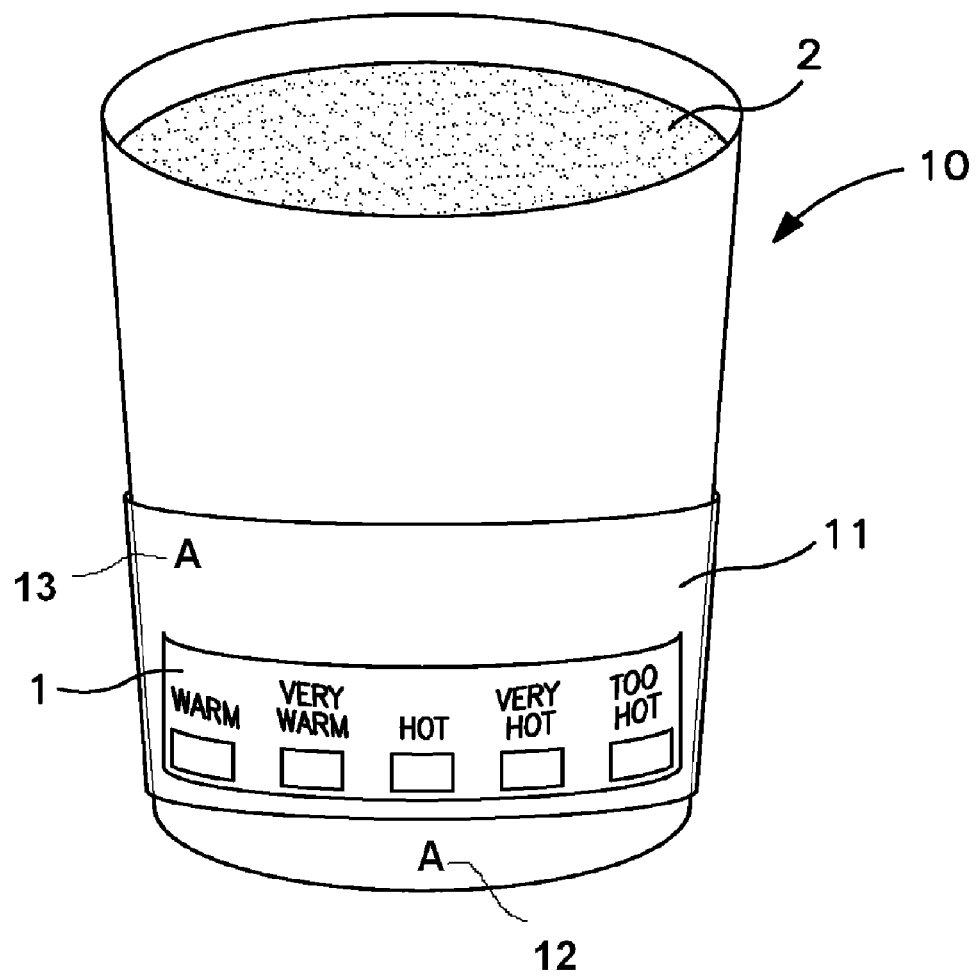
FIG. 10 is a front view of a sleeve and container combination in which both the container and sleeve contain printed symbols in accordance with another embodiment of the present invention.

FIG. 10 illustrates a container 10 having a printed symbol 12. In the example of FIG. 10, the printed symbol 12 comprises the symbol "A." The printed symbol 12 is indicative of the container's particular insulating properties. In the example of FIG. 10, the sleeve contains printed symbol 13. Symbol 13 is indicative of the container to which the sleeve should be paired or matched since the temperature indicating sleeve was made and calibrated to the container's particular insulating properties. In the example of FIG. 10, printed symbol 13 comprises the symbol "A." In FIG. 10, the container and sleeve represent a matching pair or combination as both indicated by a matching symbol, "A."

Figure 11:
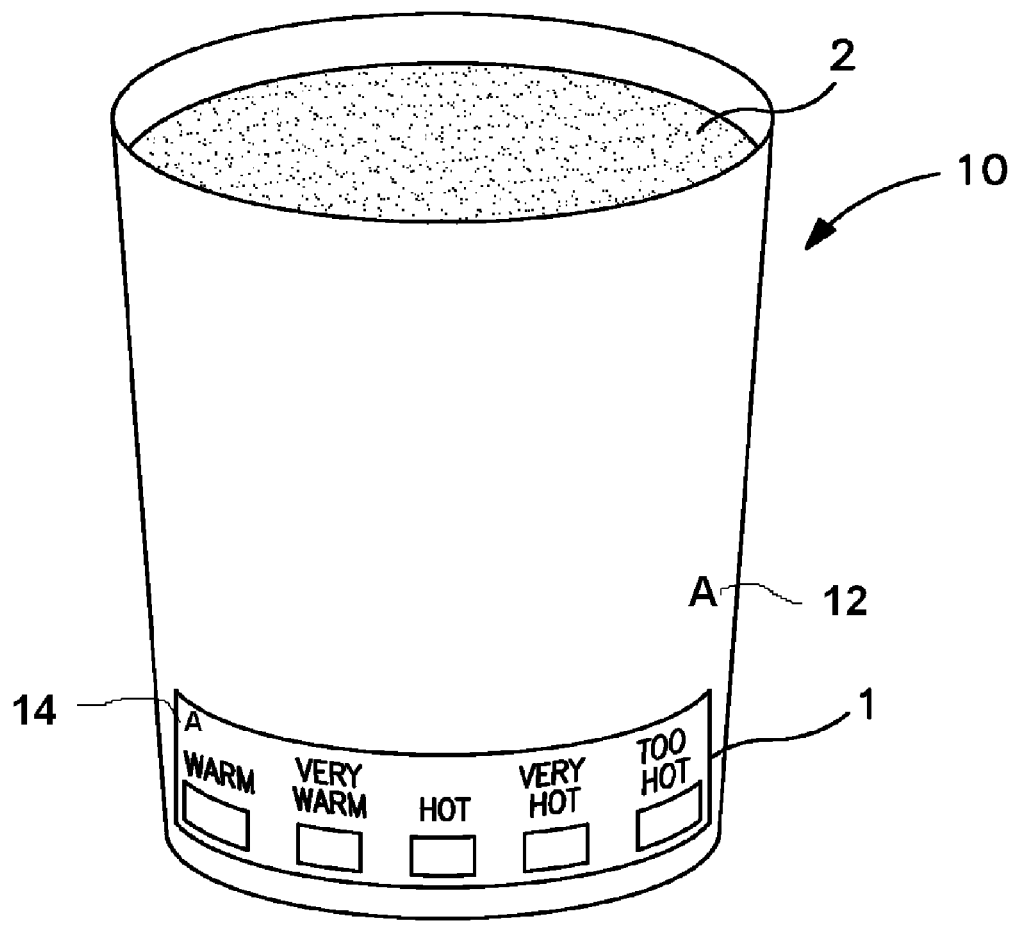
FIG. 11 is a front view of a container in which both the container and temperature indicator contain printed symbols in accordance with another embodiment of the present invention.

FIG. 11 illustrates a container 10 having a printed symbol 12. In the example of FIG. 11, the printed symbol 12 comprises the symbol "A." The printed symbol 12 is indicative of the container's particular insulating properties. In the example of FIG. 11, the temperature indicator has printed symbol 14. Symbol 14 is indicative of the container to which the temperature indicator should be paired or matched since the temperature indicator was calibrated to the container's particular insulating properties. In the example of FIG. 11, printed symbol 14 comprises the symbol "A." In FIG. 11, the container and temperature indicator represent a matching pair or combination as both indicated by a matching symbol, "A."

While the invention has been described in conjunction with the detailed description thereof, the foregoing description is intended to illustrate and not limit the scope of the invention, which is defined by the appended claims. Other aspects, advantages and modifications are within the scope of the following claims.

What is claimed is:

1. A thermally insulated container in combination with a detachable container sleeve, the combination comprising:
   a container body having a known thermal insulating property;
   the detachable container sleeve having a known thermal insulating property; and
   a visually observable temperature indicator affixed to the container sleeve and calibrated according to the known thermal insulating property of the container and/or the sleeve,
   wherein the calibrated temperature indicator is capable of determining a temperature of contents of the container to an accuracy of within about 4 F when the sleeve is placed on or around the container.

2. The combination of claim 1, wherein the container has a printed symbol indicating a preferred matching sleeve.

3. The combination of claim 2, wherein the sleeve has a printed symbol indicating a preferred matching container.

4. The combination according to claim 1, wherein the temperature indicator is attached at least partially within an opening in a side wall of the sleeve.

5. The combination according to claim 1, wherein the temperature indicator is externally attached to an outer surface of the sleeve.

6. The sleeve according to claim 1, wherein the temperature indicator comprises a temperature scale.

7. The combination according to claim 6, wherein the temperature scale is divided into increments of no more than 20 F.

8. The combination according to claim 1, wherein the temperature indicator further displays a predetermined non-numerical symbol to indicate the temperature of the contents of the container.

9. The combination according to claim 8, wherein the predetermined symbol is a word.

10. The combination according to claim 1, wherein the temperature indicator is in a form of a strip.

11. The combination according to claim 10, wherein the strip is attached substantially parallel to a longitudinal axis of the container.

12. The combination according to claim 10, wherein the strip is attached substantially perpendicular to a longitudinal axis of the container.

13. The combination according to claim 1, wherein the temperature indicator includes thermotropic liquid crystals.

14. The combination according to claim 1, wherein the temperature indicator is capable of determining the temperature within a range from about 95 F to about 180 F.

15. The combination according to claim 1, wherein the temperature indicator utilizes a single color changing mixture against a background, wherein a contrast of the mixture against the background indicates the temperature of the contents of the container.

16. The combination according to claim 15, wherein the mixture is white and the background is black.

17. The combination according to claim 1, wherein the temperature indicator is attached to the sleeve with a heat-resistant and moisture-resistant adhesive.

18. A method of manufacturing a container sleeve having a known thermal insulating property for placing on or about a container having a known thermal insulating property, comprising the steps of:

forming a continuous sleeve side wall from a generally planar strip to define a top opening and a bottom opening;

providing the temperature indicator calibrated to the known thermal insulating property of the sleeve and/or the container, which said temperature indicator is capable of determining the temperature of the contents of the container to an accuracy of within about 4 F when the sleeve is placed on or around the container; and affixing a temperature indicator on or in the sleeve side wall in a visually observable location.

* * * * *